US005514269A

United States Patent [19]

Day et al.

[11] Patent Number: 5,514,269

[45] Date of Patent: May 7, 1996

[54] DUAL SEPARATOR PURIFICATION SYSTEM

[75] Inventors: Gene F. Day, Hillsborough; Arthur E. Bliss, Sunnyvale, both of Calif.

[73] Assignee: Phoenix Precision Graphics, Inc., Sunnyvale, Calif.

[21] Appl. No.: 281,707

[22] Filed: Jul. 27, 1994

[51] Int. Cl.$^6$ .................................................. B01D 35/06

[52] U.S. Cl. .......................... 204/660; 355/257; 355/307; 210/251; 210/243

[58] Field of Search .................................... 118/603, 647, 118/652, 653; 204/149, 180.1, 186, 188, 299 R, 300 R, 302–308; 210/222, 223, 243, 251; 355/257, 307

[56] References Cited

U.S. PATENT DOCUMENTS

| | | | |
|---|---|---|---|
| 3,909,383 | 9/1975 | Sato | 210/243 |
| 4,620,917 | 11/1986 | Nozawa et al. | 204/302 |
| 4,799,452 | 1/1989 | Day | 118/645 |
| 4,895,103 | 1/1990 | Day | 118/652 |
| 4,923,581 | 5/1990 | Day | 204/180.1 |
| 5,149,422 | 9/1992 | Barrington | 210/85 |
| 5,149,433 | 9/1992 | Lien | 210/641 |
| 5,192,432 | 3/1993 | Andelman | 210/198.2 |
| 5,196,115 | 3/1993 | Andelman | 210/198.2 |
| 5,231,455 | 7/1993 | Day | 355/256 |
| 5,242,587 | 9/1993 | Barrington et al. | 210/223 |

*Primary Examiner*—Thomas G. Wyse

*Attorney, Agent, or Firm*—Schneck & McHugh

[57] ABSTRACT

A dual separator purification system and method for removing particulate as well as ionic contaminants from liquids is disclosed. The present invention is particularly useful in the electrostatic printing industry. The system comprises two disparate separators connected in series. The first separator has a repelling electrode and a rotating drum which collects charged particulate contaminants and debris. A liquid such as spent liquid toner is passed through a gap between the repelling electrode and the rotating drum. The contaminants, including colored toner particles and paper debris, move electrophoretically through the gap and adhere to the rotating drum. Upward motion of the drum surface brings the accumulated deposit out of the gap region and to a scraper blade which removes the deposit from the drum for subsequent disposal. The partially purified liquid is collected and then passed through a second separator which has a spirally-wound laminate of porous and electrically conductive layers. As the liquid passes through the porous layers of the spiral laminate, it is subjected to an electric field created between the conductive layers. The remaining contaminants within the liquid, mostly molecules that were electrically neutral during the pass through the first separator, but which slowly become ionized, move toward a conductive layer. The liquid remains in the second separator and exposed to the electric field for a relatively long time. A highly purified liquid, virtually free of contaminants, emerges from the second separator.

23 Claims, 5 Drawing Sheets

DUAL SEPARATOR PURIFICATION SYSTEM

TECHNICAL FIELD

The present invention relates to systems and methods for purifying liquids, and more particularly to the purification of liquid toners used in electrostatic printing.

BACKGROUND ART

Disposal of spent toners has long been a major problem for users of electrostatic plotters, printers and copiers. Environmental awareness, disposal costs, and strict governmental regulations relating to chemical handling and disposal have threatened the present manner of use of liquid toners. Alternatives that reduce disposal amounts and allow for reuse of some of the materials are clearly needed.

A method already exists, in principle, for eliminating the need for liquid toner disposal. This is described in U.S. Pat. Nos. 4,799,452; 4,895,103 and 4,923,581, all to G. F. Day. In this method, the toner itself is eliminated except for a transitory existence just at the moment of toning. Concentrated "ink" of each color is stored in a small tank and injected into and mixed with a continuous stream of clear dispersant. The resulting toner stream is passed through the toner applicator and then quickly decomposed back into concentrate and dispersant. This is done electrophoretically with a separator, described in the above-referenced patents. The solid pigment particles are plated out on a rotating drum, then scraped off the drum and re-dispersed by vigorous mixing into the concentrate holding tank. To stop the toning process the injection of the selected concentrate is simply terminated.

It would seem that this recycling concept might provide a liquid toning technology free of disposal problems since a large volume of contaminated or spent toner would never exist. However, the basic cause of disposal is not eliminated. Eventually the contents of the concentrate tanks would have to be discarded due to contamination as would the fluid in the dispersant tank. This is because the contaminants are re-mixed with the dispersant along with the pigment particles and are, therefore, never removed from the system. The quantity of liquid to be thrown away would be smaller, but some disposal problems would remain. The dispersant would have to be discarded when the conductivity level became high enough to interfere with image toning. A much higher level of contamination could be tolerated in the color concentrate tanks because of the dilution upon injection into the dispersant stream, but eventually the concentrate would also need replacement. In addition, the recycling architecture is relatively complex. It requires precise metering and mixing of two fluid streams and high speed separation of the toner into its components as it flows out of its applicator. With the high flows which are characteristic of full-width toner applicators, the separation apparatus must be quite large and, therefore, costly.

In order to electrophoretically separate a toner stream into its components, the fluid is passed between two closely spaced, parallel electrodes while a high voltage is imposed across the gap. All of the fluid must be exposed to the full electric field and this means the flow must normally be confined to the gap region with some kind of fluid seals along the lateral edges of the separation zone. One of the electrodes must also be moving so that the accumulating sludge can be scraped off and sent to the appropriate concentrate tank. The seals which confine the fluid flow within the gap present numerous technical difficulties. They must support the high voltage and this high voltage appears across the exposed surface of the seal which joins the two electrodes. Surface electrical breakdown keeps the applied voltage lower than would otherwise be desired and this, in turn, causes the separator to be yet larger in order to assure total separation of the solids from the clear fluid. Also, depending on the specific toner formulation, redispersion of the deposited solids layer into the color concentrate tank can be difficult and energy intensive. Thus, the range of toner formulations which can be employed for this purpose is limited.

Commonly assigned U.S. patent application Ser. No. 08/204,884 describes a method of continuously purifying small portions of the liquid toner by using a rotating drum type of electrophoretic separator to keep contamination below the level at which it will interfere with imaging. That method would benefit from a higher level of purification for each pass, however. Rotating drum-type separators are effective at removing solid contaminants such as particles of color pigment, paper debris, and ions from the fluid dispersant. In a typical spent liquid toner, however, neutral toner molecules which ionize slowly are also present. These neutral molecules are relatively unaffected by a drum-type separator. After they pass through the drum separator, they largely remain in the fluid where their slow and continuing ionization causes an undesirable increase in conductivity that interferes with electrostatic imaging. Thus, the neutral molecules act as a source for new ions. Removal of these "ionizable" molecules is necessary for complete purification of the liquid. This requires application of an electric field for a sufficiently lengthy period so that the neutral molecule source is itself depleted.

Spiral-type separators have also been used for purifying fluids and are known from the prior art. For instance, U.S. Pat. No. 5,192,432 to Andelman describes a flow-through capacitor for use in a chromatography system. The capacitor contains a plurality of spirally-wound, spaced-apart layers. Fluid flows through porous layers and is subject to an electric field across conductive layers. A purified fluid then flows from the separator. Spirally-wound separators have also been used to decontaminate diesel fuel. See U.S. Pat. Nos. 5,149,433 and 4,620,917.

Difficulties arise in the use of spiral separators with spent toners, however. The spiral separator can remove all contaminants including toner solids, paper debris, ions, and ionizable molecules. Generally, though, the spiral separator will stop functioning when a layer of solid deposits forms on one of its conductive layers and interferes with the electric field. The solid deposits which accumulate on the conductive layers tend to be more insulating than the liquid and this causes the applied voltage to appear entirely across the deposited layer, leaving zero electric field in the liquid. For this reason, spiral separators need to be replaced on a regular basis. This short operating life leads to the problem of disposal or recycling of the separator itself, as well as the high cost of supplying new separators. Similar limitations are to be expected when purifying any other liquid of a variety of contaminants, particularly when significant amounts of solid contaminants are present.

It is an object of the present invention to reduce disposal amounts of liquids having contaminants and to increase the likelihood of reuse of such materials.

It is another object to provide a purification system which is simple, economical, easy to use and durable.

It is yet another object to provide an electrostatic printing system with improved image quality and improved image consistency.

It is yet another object to provide an electrostatic printing system in which frequent replacement of materials is unnecessary.

DISCLOSURE OF THE INVENTION

The above objects have been achieved with a system and method for removing solid and ionic contaminants from a liquid, such as liquid toner, utilizing two electrophoretic separators, connected in series. By using the two separators in series, the limitations of each is avoided.

The first separator is a continuous plating-type drum separator having a rotating drum in close proximity to a repelling electrode. The repelling electrode is shaped as a cylindrical trough which houses an approximately 120° arcuate portion of the drum. Alternatively, the interior surface of a cylindrical trough comprises a repelling electrode. The liquid to be purified is introduced into the gap which separates the trough from the drum. A voltage applied to the repelling electrode causes contaminants contained within the liquid, i.e. mostly solids such as color pigment particles in the case of liquid toner, to plate onto the surface of the rotating drum where they are carried by drum rotation out of the trough and away from the liquid. The contaminants may then be scraped off the drum surface for disposal. The liquid is introduced continuously at the bottom center of the trough and flows around the drum and upward until it eventually overflows the trough and spills into a large funnel positioned directly below the trough. The liquid is then substantially free of solid contaminants and leaves the first separator through a liquid outlet opening in the bottom of the funnel. The partially-purified liquid then passes through a conduit leading to a second separator.

The second separator is a filter-type spiral separator having an elongated laminate preferably comprised of two electrically insulating but porous layers interleaved with two thin conductive layers. The laminate is spirally wound around a shaft and housed within a tightly-fitting cylinder having an opening for liquid inlet at one end and an opening for liquid outlet at the other end. After the liquid has passed through the first separator and solid contaminants have been removed, it is introduced into the second separator. The liquid flows axially through the cylindrical housing and passes through the axial length of the spiral laminate by flowing through the porous layers between the thin conductive layers. A voltage applied between the two conductive layers causes remaining contaminants, which are mostly ions generated by spontaneous ionization of molecules which were neutral during their transit through the gap of the drum separator, to be deposited on one or both of the conductive layers. The spiral laminate is of sufficient axial length and comprises numerous windings of its layers so that liquid passing through it is exposed to an electrical field for a long period of time and over a large area. The long time period allows the neutral, but ionizable, molecules to spontaneously ionize so that they can be effectively removed from the liquid. The liquid that exits the second separator is highly insulating and is suitable for reuse, for example as the clear fluid dispersant for color concentrate of a liquid toner.

An advantage of the present invention is the elimination of expensive and wasteful disposal of large volumes of liquid waste such as spent liquid toners.

Another advantage is the thorough purification of such liquids using small and inexpensive separators.

A further advantage is the ease of use of the system and method of the present invention.

BEST MODE OF CARRYING OUT THE INVENTION

Figure 1:
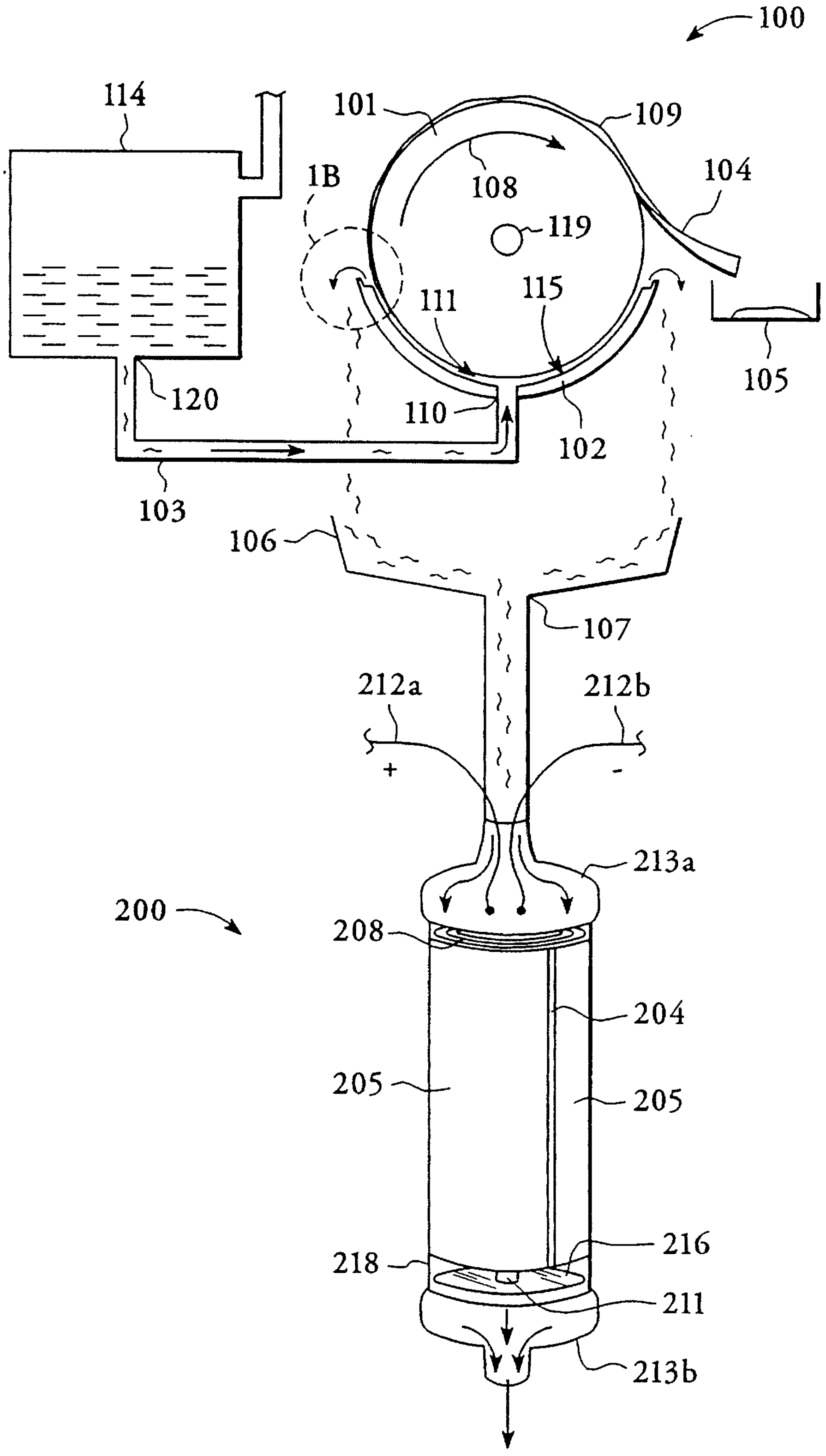
FIG. 1 shows a plan view of a dual separator purification system, according to the present invention.

With reference to FIG. 1, a drum separator 100 and a spiral separator 200 are shown, connected in series. A liquid containing contaminants is first passed through drum separator 100 and contaminants, primarily large solids such as color pigment particles and paper debris, are removed.

Liquids to be purified enter drum separator 100 through opening 110 of repelling electrode 115 in the preferred embodiment. Repelling electrode 115 is shaped as a cylindrical trough and borders an arcuate portion of rotating drum 101. The liquid generally occupies the narrow gap 111 between repelling electrode 115 and rotating drum 101. Repelling electrode 115 is biased to repel particles within the liquid which possess a like electric charge, such as toner particles. Debris particles from the imaging paper and other contaminants tend to acquire a charge of the same polarity as the toner particles. Both toner and debris particles move through the liquid and adhere to the surface of rotating drum 101.

Figure 2:
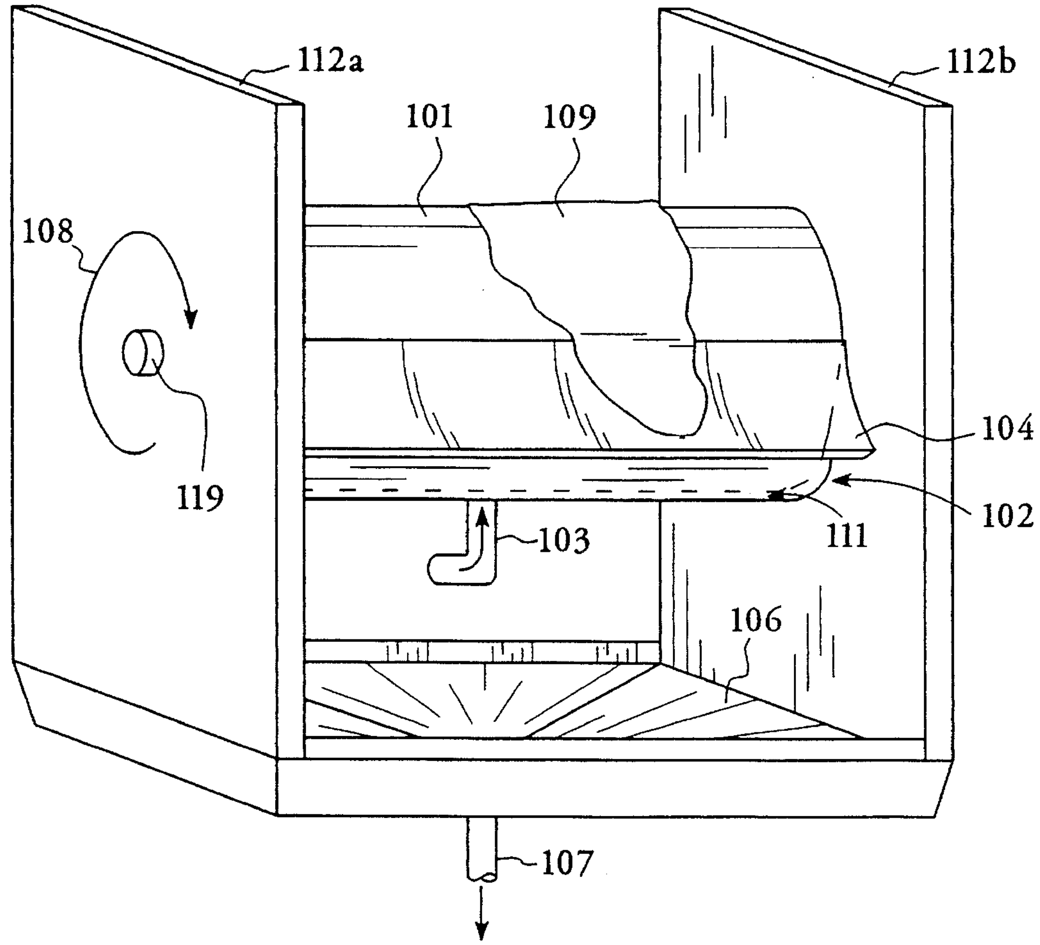
FIG. 2 shows a perspective view of the drum separator of the present invention.

Drum 101, an end view of which is illustrated in FIG. 1, with its side plates removed, rotates about axle 119 and carries the contaminants which have adhered to drum 101 in a slurry 109 out of the liquid. Drum 101 preferably has its axis in a horizontal position and the direction of rotation 108 is preferably toward a scraper blade 104 which has an edge along rotating drum 101. Scraper blade 104 scrapes slurry 109 from the drum surface. Scraper blade 104 may be a thin steel blade or, preferably, a urethane blade of the type widely used for scraping dry powder from drums in xerographic printers and copiers. The scraper blade 104 is preferably of a length approximately the width of the drum's cylindrical surface, as seen in FIG. 2. The surface of rotating drum 101 is thus cleaned and ready for further plating out of contaminants on a subsequent pass through gap 111. The slurry 109 that has been scraped off may be collected, as in waste tray 105 of FIG. 1, for removal from the system. The remaining portion of the liquid, which is allowed to spill over the top edges of the trough is now substantially free of solid contaminants, and in the case of liquid toner, is substantially color free. The flow rate of liquid into opening 110 may be adjusted so that the contaminants are plated out before the fluid reaches the lateral edges of drum 101. The liquid which is introduced into gap 111, after partial purification, spills into a catch funnel 106 which underlies repelling electrode 115. Funnel 106 preferably has sloped sides and a central opening 107, which allows for drainage of the partially-purified liquid from drum separator 100.

The liquid then passes through to spiral separator 200 for further removal of contaminants. Spiral separator 200 primarily removes molecules that have ionized since leaving drum separator 100. Spiral separator 200 contains a spiral laminate 208 contained within a cylindrical housing 218. Spiral laminate 208 contains spirally-wound porous and conductive layers. The liquid enters spiral separator 200 through end cap 213a and passes through the porous layers of spiral laminate 208 and is subject to an electric field between the conductive layers of spiral laminate 208. This electric field results from voltage application to leads 212a and 212b, each of which is connected to one of the conductive layers. Any ionic contaminants within the liquid migrate to a conductive layer, according to their net electrical charge. The liquid emerging from end cap 213b is in a highly purified, insulating, stable form. It may then be reused, e.g. as fresh fluid dispersant to which color concentrate particles may be added, for the creation of liquid toner.

Drum separator 100 is shown in a perspective view in FIG. 2. Reference numbers have been applied to parts previously described. Side plates 112a–b connect to and position the various components relative to each other. Axle 119 is connected to a gear motor, not shown, for rotation of the drum. Rotating drum 101 is preferably four inches in diameter and four inches in length, for the purpose of continuous purification of liquid toner for electrostatic printers, but may be varied for other applications. Repelling electrode 115 covers approximately 120° of the bottom of rotating drum 101 and is shaped as a cylindrical trough with its end edges at the same height as its lateral edges. Alternatively, repelling electrode 115 may be housed within the interior surface of a trough 102 or other means of containing liquid and keeping electrode 115 in close proximity with drum 101.

Figure 1B:
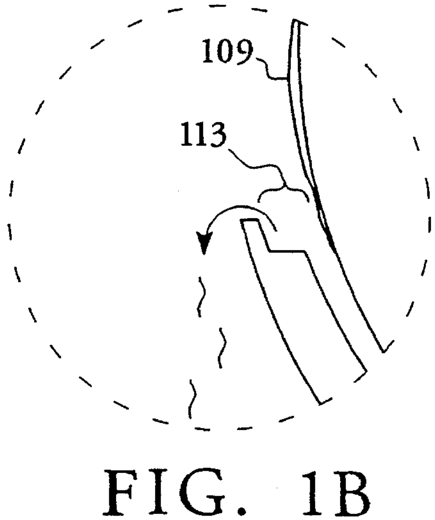
FIG. 1B is an enlarged view of a portion of FIG. 1 showing details of the drum separator of the present invention.

The gap 111 between repelling electrode 115 and drum 101, shown in FIGS. 1 and 2, is approximately 0.020 inch in width. The applied voltage is approximately 2000 volts corresponding to a field of about 100,000 volts per inch. Different combinations of gap width and voltage may be used but this combination is practical from the standpoint of flow capability. Wider gaps require higher voltage and are more prone to electrical breakdown. Narrower gaps can restrict the liquid flow too much. Generally, it is believed that the gap should be in the range 0.015 to 0.025 inches and the applied voltage in the range of 1000 to 3000 volts but other combinations may be practical depending on the size of drum 101 to be used and the characteristics of the liquid to be purified. As shown in FIG. 1B, which is an enlargement of a portion of FIG. 1, gap 111 widens to approximately 0.060 inches at the top edges of repelling electrode 115 in order to prevent electrical edge breakdown. This may occur across the liquid meniscus which bridges the gap between the top edge of trough 102 and the rotating drum 101. For the purpose of liquid toner purification, in the example below, drum 101 was electrically grounded and a voltage of approximately 2000 volts was applied to repelling electrode 115.

In the case of liquid toner, isopar G, a volatile petroleum product available from Exxon Corp., often serves as the clear fluid dispersant for color concentrate particles. The drum separator operates at a rotational rate of approximately two rpm, which is slow enough to allow any dispersant carried out of trough 102 with the solid contaminants to drain back into trough 102, resulting in a viscous slurry 109. Slurry 109 moves slowly down scraper blade 104 and generally has time to dry by evaporation. Thus, the drum separator waste dries up into chunks which easily break off and fall into waste tray 105 of FIG. 1. Waste tray 105 is removable for periodic emptying. Input supply conduit 103 of FIG. 1 is connected to a holding tank 114 at approximately the same level as drum separator 100. The top of trough 102 is positioned somewhat above the outlet 120 of holding tank 114 so that holding tank 114 never empties completely into trough 102. This insures that trough 102 remains filled to the top with liquid and that gap 111 is always filled with insulating liquid rather than with air, which can break down electrically.

Figure 3:
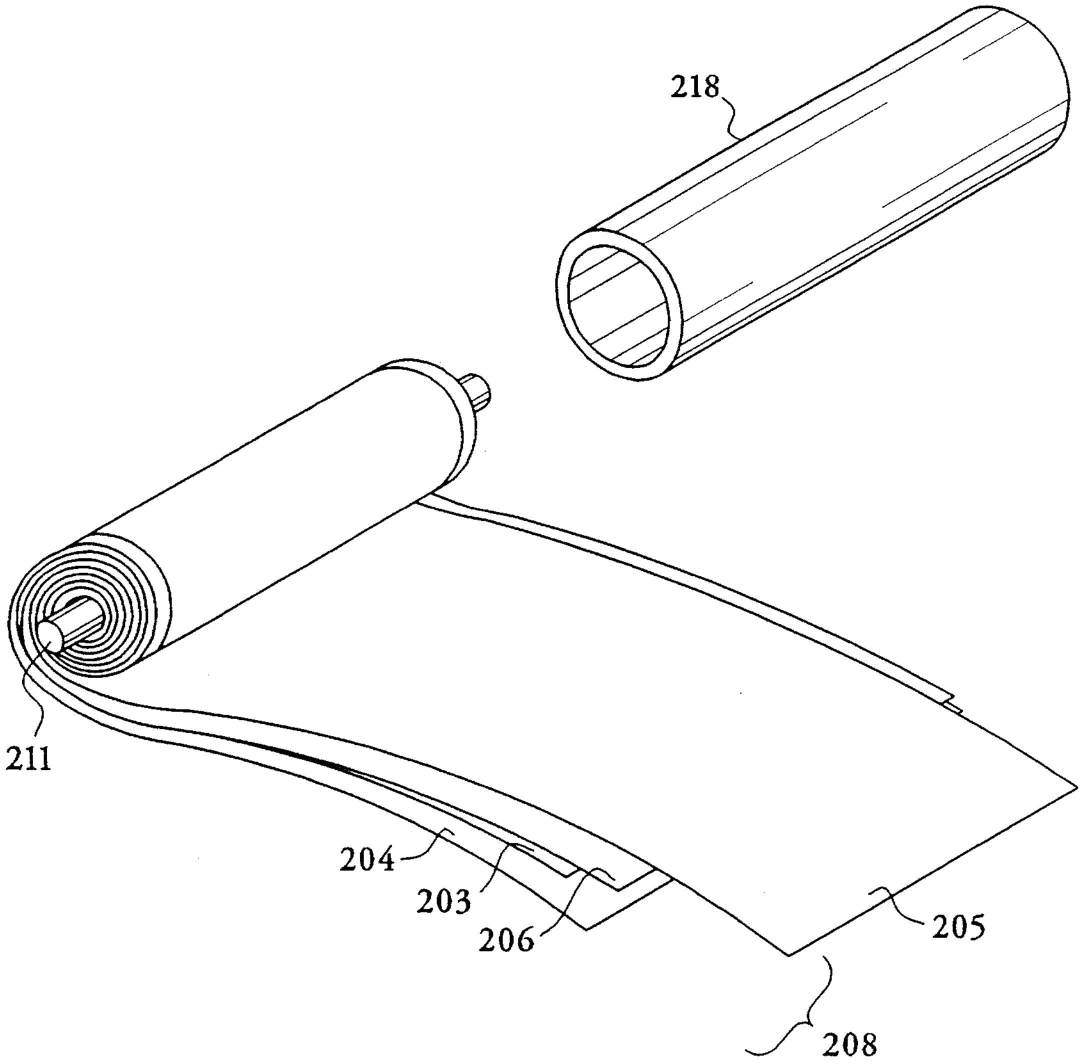
FIG. 3 shows an exploded view of a preferred embodiment of the spiral laminate and cylindrical housing of the spiral separator.
Figure 4:
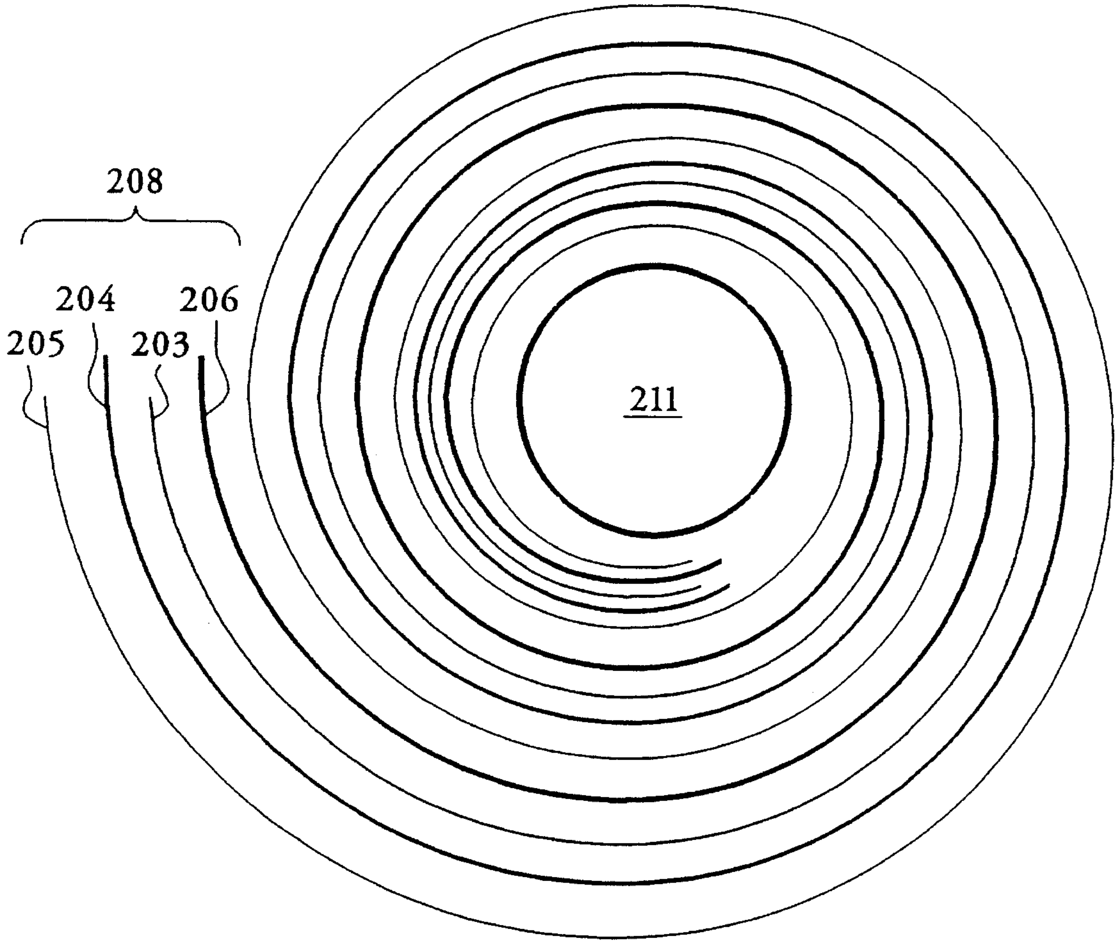
FIG. 4 shows an end view of a preferred configuration of layers in the spiral laminate of the present invention.

Details of spiral separator 200 are shown in FIGS. 3 and 4. The spiral laminate 208 is made up of alternating layers of porous material 204 and 206, such as continuous-filament polypropylene paper, available from Kimberly-Clark, and electrically conductive material 203 and 205, such as aluminum foil. Spiral laminate 208 is tightly wound around a supporting shaft 211 and then inserted into a close-fitting housing 218, seen in FIG. 3. Housing 218 may have two end caps, 213a–b shown in FIG. 1, with openings for liquid inlet and outlet. Alternatively, housing 218 may be shaped to have a liquid inlet opening at one end and a liquid outlet opening at the other end. For liquid toner purification, spiral laminate 208 is preferably approximately four inches in axial length, four inches in diameter, and wrapped around a shaft that is an aluminum rod, three-eighths of an inch in diameter. The conductive layers 203 and 205 are generally 0.001 inch thick and the porous layers 204 and 206 are 0.01 to 0.02 inch thick. The layers are of sufficient length to allow for approximately forty turns around shaft 211, in the preferred embodiment. All of these dimensions may be adjusted as appropriate for the application. Electrical leads, such as thin wires 212a–b, shown in FIG. 1, are placed in contact with conductive layers 203 and 205 to bias the conductive layers relative to each other. Electrical leads 212a–b may extend out of spiral separator 200 through an end cap, as shown with end cap 213a of FIG. 1. The holes should be sealed to prevent liquid leakage. As liquid passes through spiral laminate 208, it is subject to approximately 600 volts applied between electrical leads 212a–b. Charged particles are attracted to one of the conductive layers 203 and 205, depending on their electrical charge polarity. The remaining liquid continues to pass through spiral separator 200 and emerges in a substantially ionic-contaminant-free condition. Spiral separator 200 may optionally contain a layer of activated charcoal 216, shown in FIG. 1, near outlet 213b. Activated charcoal is available in granulated form from various sources, including American Norit Co. Charcoal layer 216 counteracts possible discoloration of the liquid due to oxidation caused by lengthy exposure of the liquid to the electric field within spiral separator 200. This oxidation, if excessive, can affect the imaging properties of the liquid toner. Screens within cylindrical housing 218 may be inserted to separate charcoal layer 216 from spiral laminate 208 and outlet 213b, or a cloth bag containing activated charcoal may be used. Oxidation of the liquid can also be inhibited by chemical anti-oxidants, as is well known in the liquid toner formulations art.

In one embodiment, shown in FIG. 4, the layers are attached to shaft 211 in the following order: conductive layer 205 first, then porous layer 206, conductive layer 203, and porous layer 204. The laminate is then wound around shaft 211 so that conductive layer 205 occupies the innermost position in the finished spiral. For convenience in winding, the leading edges of the respective layers may be taped, using insulating, self-adhering tape, to shaft 211 and to each other. When the laminate is substantially wound, conductive layer 205 is extended around the spiral once more, providing an electrically conductive and relatively biased outer layer. This ensures that porous layers 204 and 206 are entirely sandwiched between conductive layers 203 and 205 and that liquid traveling through the porous layers of spiral laminate 208 will be subject to the electrical field throughout its traverse. Porous layers 204 and 206 are adjusted slightly in width and length as necessary to prevent conductive layers 203 and 205 from contacting each other directly and causing an electrical short.

Although two porous layers and two conductive layers have been shown, it is also possible to use a greater number of porous and conductive layers. A greater number of electrical leads may be necessary to relatively bias the conductive layers, however. As with the preferred embodiment of the present invention, the porous layers are interleaved with the conductive layers and extended as necessary to prevent contact of the conductive layers.

Another possible embodiment of the present invention includes the use of one porous layer, two conductive layers, and some other insulating, but non-porous, layer in the spiral laminate. At least one porous layer is needed for liquid flow through the laminate. The insulating layer may replace one of the porous layers in the spiral laminate, however, and function simply to prevent contact of the conductive layers.

Additionally, the laminate of spiral separator 200 may be altered to some configuration other than a spiral. A spiral winding was implemented simply to confine the various layers efficiently to a small space and because such a configuration is easy to produce.

The dual separator purification system of the present invention is of particular utility in situations where the liquid to be purified contains charged particles, as well as neutral particles that ionize slowly. Use of drum separator 100 to remove color pigment particles and other charged particles, followed by spiral separator 200 to remove further ionic contaminants, results in a clear, highly purified liquid that is virtually free of charged particles and which remains highly insulating in storage. In the liquid toner example, the ionization kinetics of the contaminant molecules are relatively slow and so increased purification time was an important concern in the development of the purification system and method. Drum separator 100 removes existing ionic contaminants from the liquid, but the ionized fraction of contaminant molecules is small. To remove substantially all of the contaminants, the electric field must be applied for long enough to allow equilibration of the ionized and neutral fractions, i.e. as ions are removed from the liquid, some previously neutral molecules become ionized and must, therefore, be removed. The transverse electric field must be sustained until the ion source is depleted.

In an application such as liquid toner purification, the dispersant contained in the printing system passes periodically through the spiral separator. It is not, in this case, necessary that all of the ionizable molecules be completely removed in any one transit through the spiral separator. It is generally only necessary that the concentration of such ionizable species be kept low enough to eliminate the need to replace the toner due to contamination. Even the removal of a relatively small percentage, such as one percent, of the ionizable molecules during one transit through the spiral separator may be sufficient to control contamination effectively. The percentage removal required per transit depends on application and image quality requirements. Removal of the required minimum percentage will insure that a stable, steady-state condition is achieved in which image quality is consistent and image colors predictable and for which toner replacement is unnecessary. It may be more economical to remove the ionizable species from only a small portion of the liquid toner of an electrostatic printing system, according to the system and method of the present invention. A small required removal percentage corresponds to a small and economical spiral separator. This partial removal also has the advantage of minimizing oxidation effects, in this application.

The amount of liquid being purified differs between the two types of separators. Drum separator 100 purifies a volume of approximately 0.01 cubic inches whereas spiral separator 200 purifies a volume of approximately 20 cubic inches. The flow through spiral separator 200 may also be stopped, e.g. during image writing and toning, so that the liquid is exposed to the decontamination process of the electric field for an even longer time period.

The dual separator purification system of the present invention may be used to purify for reuse liquid toners which have been removed from electrostatic printing systems. This may be done by using the two separators in series in a location removed from the electrostatic printing system. The purified dispersant may then be used for mixing new toners, for return to a toner manufacturer for credit towards a new toner purchase, or to enhance the purity of newly purchased dispersant. Another manner of carrying out the present invention is by incorporating the dual separator purification system into a continuous electrostatic printing and toner purification system. An example of the latter application is depicted in the schematic diagram of FIG. 5.

Figure 5:
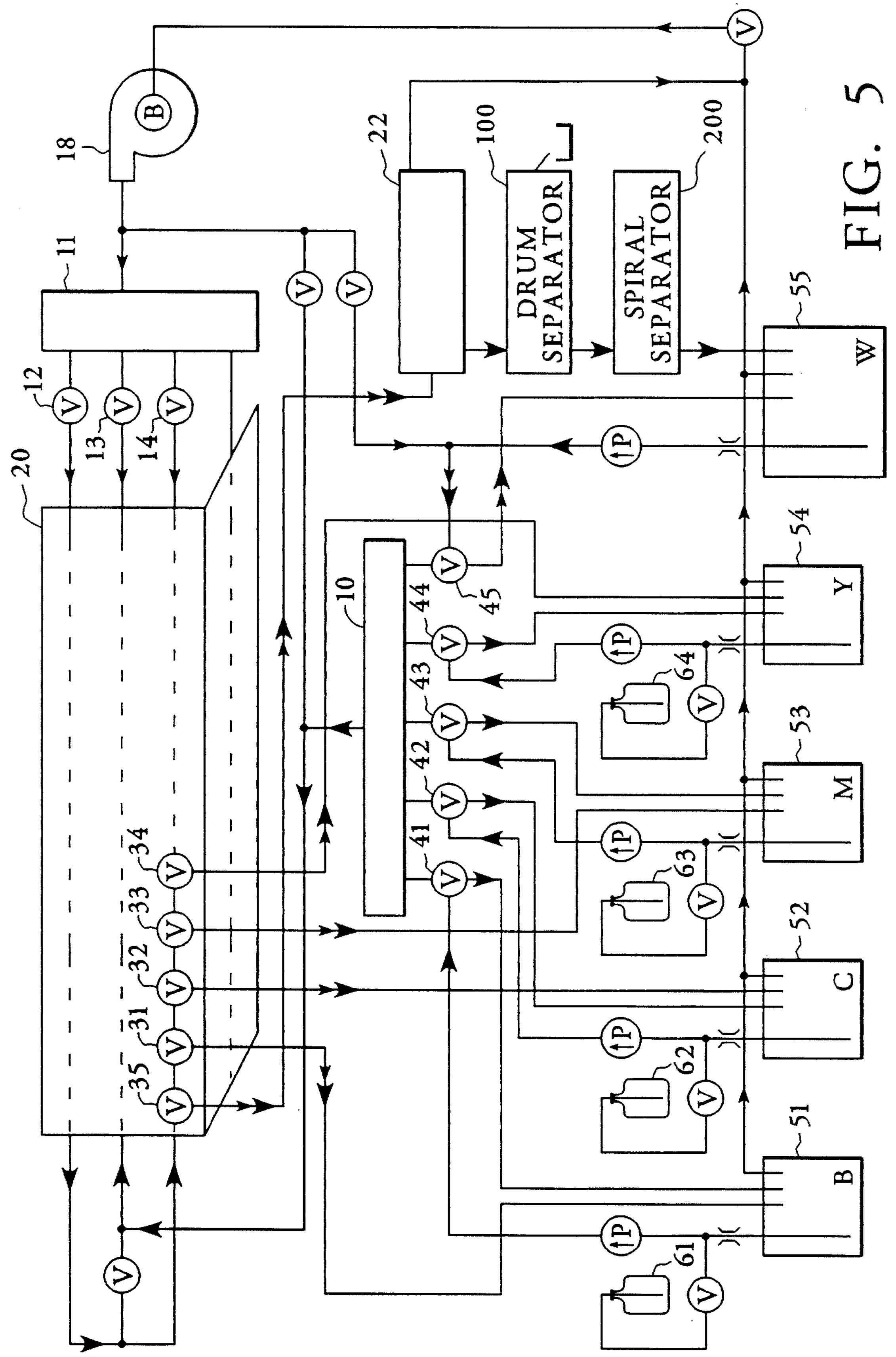
FIG. 5 presents a schematic view of an electrostatic printing system utilizing the dual separator purification system of the present invention.

In FIG. 5, large arrows indicate liquid flow and small arrows indicate air flow. The lines that contain both large and small arrows carry both liquid and air. The colors black, cyan, magenta, and yellow are typically used in a four-color printing system and are shown in toner tanks 51–54, respectively. The color toners are continually pumped out of their toner tanks and circulated up to input selector manifold 10. When a particular color is to be used, the valve corresponding to the color 41-44 is opened and the color toner enters input selector manifold 10. From there, it is directed to toning applicator 20 which contacts the paper or other printing surface and which may extend the full width of the web upon which the printing will occur. Tank 55 contains wash fluid, i.e. the same clear fluid dispersant, such as isopar G, that is used to disperse color pigment particles to make the color toners contained in toner tanks 51–54. The wash fluid is circulated and in connection with input selector manifold 10 in the same manner as the color toners.

After a color toner has been applied to paper via toning applicator 20, the liquid remaining within toning applicator 20 is substantially removed by an air purge loop having its source at blower 18. The color toner is drained back into the appropriate toner tank through the operation of the air purge and the appropriate valve 31-34. Approximately five milliliters of color toner is purposely left behind in toning applicator 20. Then toning applicator 20 is washed via a pass of approximately three hundred milliliters of wash fluid which carries away the five milliliters of color toner left behind in toning applicator 20 from the previous color pass. The dirty wash fluid then drains into holding tank 22 before it enters into the dual separator purification system of the present invention. The next color toning pass is then started by the opening of one of the valves 41–44, flow of the selected color into input selector manifold 10, and input of the color toner into toning applicator 20, as with the previous color pass. Wash fluid passes occur between color passes so that there is no cross-contamination of the different color toners. Generally, four-color printing occurs via separate color passes in a dark to light sequence, so the typical order of toner usage is as follows: black, wash, cyan, wash, magenta, wash, yellow, wash.

The air purge loop within this system is optional, as drainage of toning applicator 20 may be effected by other means, such as gravity flow. The use of an air purge loop through the various lines is preferable, however, as it allows for rapid, controlled removal of color toner from toning applicator 20. The air purge loop includes blower 18, pressure manifold 11, and valves 12–14 for purging of various drain and supply lines. An air jet cleaner is described in commonly assigned U.S. Pat. No. 5,231,455. A mixture of air and dirty wash fluid enters holding tank 22. Liquid is gravitationally drained from holding tank 22 and enters the dual separator purification system. The air in holding tank 22 is removed via an outlet at or near the top of holding tank 22, and reenters the air lines and eventually the inlet of blower 18. An internal baffle may help reduce splatter within holding tank 22. In the same manner, the mixture of air and color toner that drains into toner tanks 51–54 is separated by gravity. Air is removed from each toner tank through an outlet at the upper portion of the toner tank and reenters the air lines.

During a color pass, the toning process carries out some of the color pigment particles as visible image. The toner within the electrostatic printing system leaving toning applicator 20 is therefore somewhat diluted in terms of color pigment percentage. Therefore, color concentrate from concentrate bottles 61–64 may replenish the color toner in toner tanks 51–54, as necessary.

After dirty wash fluid has passed through holding tank 22, it first enters drum separator 100 and then spiral separator 200 to undergo the purification process of the present invention. Purified wash fluid, which is clear, low-conductivity isopar in this example, emerges from the second separator and reenters wash fluid tank 55 for reuse in the system. The clear dispersant in tank 55 is thereby kept in a high purity, highly insulating condition. Mixing of a portion of the wash fluid into the toners therefore does not degrade the toners.

The electrostatic printing system depicted in FIG. 5 incorporates a continuous purification system. Each color toner pass and subsequent air purge leave approximately five milliliters in toning applicator 20. The washing process carries this five milliliters of color toner and any other paper debris or chemical contaminants received from the contact of toning applicator 20 and the printing surface out of toning applicator 20 and into the dual separators for purification. The clean wash fluid reenters wash fluid tank 55 and is reused for subsequent washing of toning applicator 20. After washing and air purging of the wash fluid, there remains as much wash fluid in the applicator, 5 to 10 milliliters, as there was toner after toner purging. Normally, each liquid is purged into its respective holding tank. Each toner tank has a level sensor, however, and, if the contents of a toner tank drop below a pre-determined level, the wash fluid may be purged into that tank to control the liquid level. In this way the liquid level in each toner tank is automatically controlled. The user need only resupply clear liquid dispersant to the wash fluid tank. This is a neat and clean process because colored toners are not involved. As needed, fresh bottles of concentrate may be replaced by simply unscrewing the empty bottle and replacing it with a new one. These new concentrate bottles may have neck seals consisting of thin foil. The new bottle is raised towards a mounting receptacle causing a concentrate withdrawal needle to penetrate the foil. The clean plastic cap from the new bottle is used to seal the empty bottle. Thus the replacement of concentrate is also a clean, non-messy process. As the user never has to handle toners themselves, operation of the printer is a clean process and suitable for an "office" environment. The applicator and associated plumbing is self cleaning since it is washed by the wash fluid.

The amount of contaminants removed from a toner by the purification system during a color pass is proportional to the amount of toner left in the toning applicator after purging with air. By adjusting the time duration of air purging, this amount of residual toner can be controlled. It is believed that contact of the toner with the printing paper during a toning pass introduces a small amount of deleterious contaminants into the toner. Thus a fixed amount of contaminants is introduced per pass. On the other hand, the amount of contaminants removed per pass is proportional to the contaminant concentration. This means that the contaminant concentration will slowly build up until the amount removed per pass just balances the amount picked up per pass and the limit is approached asymptotically. By adjusting the air purging time, this steady-state contaminant level may be held to any desirable level. With very brief air purging, more toner is left behind to be intermixed with the wash fluid and removed from the system. This results in a lower steady-state contamination level. It also results in a larger amount of solid waste in the tray to be discarded, but the amount of waste is, at most, only a few grams per day. This is insignificant in comparison to the large amount of liquid waste produced in the prior art. The drum separator lasts indefinitely and does not require replacement. The spiral separator has a very long life depending on its size and other factors. It is expected that it will have a useful life of several years in practice. The continuous purification system described is similar to that disclosed in commonly assigned U.S. patent application Ser. No. 08/204,884.

A user of an electrostatic printing system containing the dual separator purification system of the present invention need only throw out solid contaminants collected in waste tray 105, replace color concentrate bottles 61–64 because color pigment particles are used for the images printed and a small amount is lost through the purification system, and add wash fluid which is steadily lost to the printed paper and to some evaporation within the system. All of these tasks need only be performed on an occasional basis. In one week of operation of an electrostatic printer having the dual separator purification system, at a rate of eighty large color prints per day, about two ounces of solid contaminants are collected and need to be discarded. The amount of waste and ease of removal of that waste represent a significant advancement over previous methods. The requirement of removing and disposing of large volumes of spent toner has been eliminated.

We claim:

1. A dual separator purification system for liquids, the system comprising, (a) a first separator having
   (i) a moving surface adherent to contaminants,
   (ii) an electrode spaced apart from a portion of the moving surface and defining a gap therebetween for fluid flow,
   (iii) means for introducing a liquid into the gap,
   (iv) means for relatively biasing the electrode and the moving surface so that the liquid within the gap is subject to an electric field and contaminants within the liquid adhere to the moving surface, and
   (v) means for collecting the liquid after exposure to the electric field within the first separator, and (b) a second separator having (i) a laminate of at least one porous layer for fluid flow and at least two conductive layers, (ii) means for introducing the liquid into the porous layer of the laminate, the means for introducing the liquid into the porous layer being in fluid flow communication with the means for collecting the liquid from the gap of the first separator, (iii) means for relatively biasing the conductive layers of the laminate so that the liquid within the porous layer is subject to an electric field and contaminants within the liquid adhere to at least one of the conductive layers, and (iv) means for collecting the liquid after exposure to the electric field within the second separator.

2. The system of claim 1 wherein the laminate of the second separator comprises a plurality of porous and conductive layers.

3. The system of claim 2 wherein each of the porous layers of the laminate is positioned between two of the conductive layers.

4. The system of claim 1 wherein the laminate of the second separator further comprises an insulating layer and a shaft, the laminate being spirally wound around the shaft with one of the porous layer and the insulating layer positioned between the conductive layers within the wound laminate to prevent contact of the conductive layers.

5. The system of claim 1 further comprising means for removing the contaminants which have adhered to the moving surface of the first separator.

6. The system of claim 1 further comprising means for confining the laminate of the second separator within a housing.

7. A dual separator purification system for liquids, the system comprising (a) a drum separator having (i) a rotating drum with a surface adherent to contaminants, (ii) a repelling electrode bordering a portion of the surface and defining a gap therebetween, (iii) means for relatively biasing the repelling electrode and the surface, (iv) a scraper blade urged against the surface at a position away from the gap, and (v) a funnel disposed below the repelling electrode, whereby contaminants within a liquid introduced into the gap move away from the repelling electrode and adhere to the surface, the contaminants that adhere to the surface being scraped from the surface by the scraper blade and removed from the system, the liquid exits the gap to be collected by the funnel, and (b) a spiral separator positioned to accept the liquid from the funnel of the drum separator, the spiral separator having (i) a laminate of alternating porous and conductive layers including, (1) a first conductive layer, (2) a first porous layer, (3) a second conductive layer, and (4) a second porous layer, (ii) means for biasing the first and second conductive layers relative to each other, and (iii) a cylindrical housing for insertion of the spiral laminate, the housing having openings for liquid inlet and outlet, whereby the liquid introduced at the liquid inlet opening flows between the conductive layers via the porous layers, contaminants within the liquid are attracted to at least one of the conductive layers, the liquid being removed from the housing via the liquid outlet opening.

8. The system of claim 7 wherein the surface is adherent to color pigment particles and debris contained within liquid toner of the type used in electrostatic printing.

9. The system of claim 7 wherein the conductive layers are attractive to ionic molecules contained within liquid toner of the type used in electrostatic printing.

10. The system of claim 7 further comprising a shaft about which the laminate is spirally wound.

11. The system of claim 10 wherein the laminate is spirally wound around the shaft so that the first conductive layer is positioned proximate to the shaft and extended around the substantially-wound spiral laminate to also be positioned as the outermost layer of the spiral laminate, the porous layers being of slightly larger dimension than the conductive layers to prevent contact of the conductive layers.

12. The system of claim 7 wherein the means for biasing the first and second conductive layers comprises two wires, each wire being in contact with one of the conductive layers and with a source of electrical voltage.

13. The system of claim 7 wherein the repelling electrode contains an opening for liquid inlet positioned near the center of the repelling electrode.

14. The system of claim 7 wherein the rotating drum is positioned to have a horizontal axis of rotation.

15. The system of claim 7 wherein the scraper blade is approximately equal in length to the width of the surface of the rotating drum.

16. The system of claim 7 further comprising a removable waste tray positioned below the scraper blade for collection of contaminants which have been scraped from the surface by the scraper blade.

17. The system of claim 7 wherein the funnel has a cup which is wider than the widest dimension of the repelling electrode and is positioned with its cup proximate to the repelling electrode.

18. The system of claim 7 further comprising an activated charcoal filter positioned within the housing proximate to the liquid outlet opening.

19. A purification system for the removal of charged contaminants from a liquid, the system having means for flowing a liquid having charged contaminants through a narrow gap, the gap having an electrode on one side and a surface adherent to charged contaminants on the other side, means for electrically biasing the electrode with a like polarity as that of the charged contaminants so that the charged contaminants within the gap move away from the electrode and adhere to the surface, means for moving the surface away from the gap so that the contaminants that have adhered to the surface move away from the liquid, means for collecting the liquid after it has flowed through the gap, means for flowing the collected liquid through a plurality of porous layers, each porous layer sandwiched between conductive layers, means for relatively biasing the conductive layers so that the charged contaminants within the liquid are attracted to at least one of the conductive layers, and means for collecting the liquid after it has flowed through the porous layers.

20. The system of claim 19 wherein the narrow gap contains wider portions at its ends.

21. The system of claim 19 wherein the surface is a looped surface, and the means for moving the surface continuously drives the surface along the one side of the gap.

22. The system of claim 19 wherein the means for flowing the liquid through the gap includes a holding tank which has an outlet positioned below the level of the top of the gap so that the gap remains filled with liquid.

23. The system of claim 19 further comprising means for removing the contaminants that have adhered to the surface, and means for collecting the contaminants that have been removed from the surface for disposal.

* * * * *